Patented July 16, 1940

2,208,510

UNITED STATES PATENT OFFICE 2,208,510

PROCESS FOR SWEETENING HYDROCARBON OILS

Charles M. Blair, Jr., Webster Groves, Mo., and Ira S. Boydstun, Fort Worth, Tex., assignors to Petrolite Corporation, Ltd., Wilmington, Del., a corporation of Delaware No Drawing. Application November 30, 1939, Serial No. 306,966

13 Claims. (Cl. 196—33)

Our invention relates to the sweetening of hydrocarbon oils and more particularly has reference to improvements in the conventional doctor treatment for the removal of mercaptans from light hydrocarbon distillates such as gasoline, naphtha, kerosene, benzine and petroleum oils in general.

It is a principal object of the invention to render the doctor treatment more rapid and economical and to produce sweetened distillates of unusually desirable properties.

The doctor treatment has long been applied to petroleum oils for the removal of mercaptans. It involves treatment of the oils with elementary sulfur and an aqueous alkaline solution of sodium plumbite, known as the "doctor solution." The plumbite solution effects a chemical reaction between the mercaptans and the elementary sulfur, resulting in the conversion of the mercaptans to dialkyl disulfides and also into some trisulfide, while the sulfur is converted mainly into sulfides, polysulfides, thiosulfates, etc.

In practicing the conventional doctor treatment, an excess of elementary sulfur is used to bring about a "break," a term used in the art to indicate the settling or subsidence point in the doctor treatment. That is to say, the amount of free sulfur used is in excess of the theoretical quantity required to convert the mercaptans into disulfides and other innocuous compounds, the excess serving to induce the "break" in the treatment. Such use of elementary sulfur to effect settling or subsidence results in the incorporation of sulfur into the distillate, with its attendant objections. Among these objections, in the case of gasoline, are poor inhibitor and tetraethyl lead susceptibility, lowered anti-knock value, increased corrosive action on metals, poor color and odor stability, and increased tendency to form gum.

Although doctor treatment in its many variations is well understood in the art, it may be well to emphasize, by a suitable reference, the circumstances and conditions attending a break and the difficulty of coagulating the colloidal black precipitate.

"Doctor plants differ in the way in which doctor solution and sulfur are mixed with the gasoline and the length of time they remain in contact. It is common practice to add the sulfur in gasoline solution before, at the same time as, or after the gasoline and doctor solutions are mixed. The mixing may be done by orifice plates, baffled pipes, pipes with right-angle bends, or mechanical mixing devices, and mixing time may vary from a few seconds to several minutes.

"When sulfur is added to a mixture of gasoline and doctor solution, the oil becomes orange-red in color; after a longer or shorter time, depending on the gasoline and the amount of sulfur added, the 'break' takes place, when the color disappears and a red-brown to black precipitate, usually called lead sulfide, forms and settles.

"In different plants, the break may be produced as the gasoline leaves the mixers or it may not occur until after the gasoline has entered the settling drum. If a plant has adequate mixing (the proper time of mixing will depend on the type of gasoline and somewhat on the degree of sourness), the gasoline may be allowed to break as it leaves the mixers, and the amount of sulfur required to do this will not be so great as to harm inhibitor susceptibility. However, if a plant has little mixing equipment (a common installation is three mixing nozzles in about six feet of line, which for most gasoline is much less mixing than is desirable), a break cannot be obtained in the mixers without using a considerable excess of sulfur, with consequent detriment to the inhibitor effectiveness. If, however, the break in such plants occurs in the first settler from three to fifteen minutes after the gasoline leaves the mixers, the results from an inhibitor standpoint will usually be satisfactory. But when the break occurs in the settler, the gasoline being no longer in contact with doctor solution, it tends to produce a finer precipitate, settling more slowly than when the gasoline is broken out while still in contact with doctor solution. As plants deficient in mixing equipment are also often lacking in settling capacity, the treater in such cases faces a serious dilemma. If he uses excess sulfur, his gasoline settles well but inhibitor susceptibility is poor; if sulfur is kept down, the gasoline breaks and settles slowly and lead sulfide leaves the plant suspended in the gasoline." (Industrial & Engineering Chemistry, vol. 30, No. 11, Nov. 1938. p. 1276).

Thus, in actual practice, the present trend has been to continue to use sulfur as a break inducer, insofar that no universal and economic solution of the problem has been heretofore available. Some effort has been made to solve the problem by subsequent washing with aqueous solution, but this has resulted in attendant loss of expensive lead. Another approach to the problem concerned the use of sodium oleate, sodium resinate, sodium stearate, sodium palmitate, and other simple unmodified fatty materials as break inducers for replacing a part of the sulfur which is ordinarily used as a break inducer. It is not believed that such procedure is ordinarily applicable as a complete substitute for sulfur as a break inducer. Or, in other words, it is not believed that any attempt has been made to apply such process in instances where the amount of elementary sulfur represented only theoretical quantities and which would necessitate that the simple fatty materials, such as soap, be relied upon solely as the break inducer.

We have now found that certain esterification products, whose exact composition is not known to us, possess the property of inducing a break in the doctor treatment and our invention involves their use, in the sweetening of sour oils by means of plumbite solution and elementary sulfur, to effect the settling or subsidence in the known sweetening process.

More specifically, the break inducers contemplated for use in the present process are products derived by esterification reactions between compounds containing a monocarboxy detergent-forming acid radical and a polybasic carboxy acid or anhydride.

The monocarboxy acid radicals contemplated are those derived from detergent-forming acids having from 8 to 32 carbon atoms and are exemplified by fatty acids, naphthenic acids, rosin acids, or by simple modifications thereof which retain the ability to react with alkali to form soap or soap-like products.

Examples of polybasic carboxy acids or anhydrides suitable for use in the manufacture of the break inducers used in the present process are maleic anhydride, maleic acid, fumaric acid, oxalic acid, phthalic acid, phthalic anhydride, citric acid, citriconic acid, etc. Other suitable polybasic carboxy acids may be prepared by the diene synthesis, which involves condensation of alpha, beta unsaturated acids or anhydrides with compounds containing conjugated double bonds. For example, the condensation of maleic anhydride with alpha terpinene yields a dicarboxy acid which is perfectly suitable for use in the manufacture of the break inducers contemplated herein. Other polycarboxy acids may be prepared similarly by the diene synthesis reaction involving the condensation of an alpha, beta unsaturated monocarboxy acid with a carboxy acid containing a conjugated double bond. For example, crotonic acid may be condensed with abietic acid, which contains a conjugated double bond, to yield a dicarboxy acid suitable for the use in the manufacture of the break inducers contemplated herein.

Since the break inducers used in our process are derived by esterification reactions between (I) compounds containing a detergent-forming monocarboxy acid and (II) a polybasic carboxy acid, it is necessary that either I or II contain an alcoholic hydroxyl group. Such alcoholic hydroxyls are present in some detergent-forming acid molecules, and when such acids are employed they may be esterified directly by the polybasic acid. Obviously the esters, salts, and other derivatives of such acids which leave the hydroxyl and oxyacyl groups intact, may also be employed. Examples of suitable hydroxy detergent-forming acids or their functional equivalents are: hydroxy-stearic acid, ricinoleic acid, trihydroxy palmitic acid, hydroxy naphthenic acid, tridihydroxystearin, triricinolein, butyl ricinoleate, ethyl dihydroxy stearate, ethylene glycol diricinoleate, etc.

In some cases it is desirable to form a partial ester of these hydroxy detergent-forming acids with a polyhydric alcohol to yield a compound having more than one hydroxyl group available for reaction with the polybasic acid. Examples of such esters are: glyceryl monoricinoleate, glyceryl diricinoleate, ethylene glycol monodihydroxy stearate, diethylene glycol monohydroxy stearate, sorbitol di-dihydroxy stearate etc.

In addition to the common fatty acids and other detergent-forming acids described above, the present invention is intended to include, for the manufacture of the break inducers, the use of fatty acids and partial esters of fatty acids obtained by the drastic oxidation of non-drying and semi-drying oils, such as castor oil, sunflowerseed oil, cottonseed oil, rapeseed oil, soybean oil, etc. Acids and esters prepared from such blown or drastically oxidized oils, are regular articles of commerce obtainable on the market. Other detergent-forming acids suitable for preparing the present break inducing agents may be prepared by blowing or oxidizing unsaturated fatty acids, such as castor oil fatty acids, soybean fatty acids, oleic acid and the like.

When the detergent-forming acid itself does not contain an alcoholic group, it may be reacted with a polyhydric alcohol to yield a partial ester having one or more residual hydroxyls available for esterification with a polybasic acid.

Conversely, the polybasic acid used may first be esterified with the polyhydric alcohol to yield esters having unreacted hydroxy groups available for esterification of the detergent-forming acid.

If the detergent-forming material does not contain an alcoholic hydroxyl radical, we have found that the reaction is usually easier to control, in order to obtain the desired final products, if the polyhydric alcohol intended to be used is first reacted with the detergent-forming acid and the fractional ester so obtained subsequently reacted with the polybasic acid.

Examples of polyhydric alcohols which may be employed to bring about ester formation between detergent-forming acids and polybasic acids are: glycerol, diglycerol, alpha, beta, gamma butanetriol, beta methyl glycerol, ethylene glycol, diethylene glycol, triethylene glycol, 1,3-propane diol, isobutylene glycol, ethylene glycol glycerol ether, diglycerol monoethylene glycol ether, mannitol, sorbitol, sorbitol monobutyl ether, erythritol, adonitol, dihydroxy thiopene, etc.

For the purposes of this invention, polyhydroxy amines are considered the functional equivalents of polyhydroxy alcohols. Examples of such compounds are: monoglycerylamine, triethanolamine, diethanolamine, phenyl diethanolamine, dicyclohexanolamine, cyclohexyl propanolamine, benzyl diethanolamine, pentanolamine, diethanol methylamine, tripropanolamine, etc. Ethers derived from this class of compounds or in combination with the previously mentioned diols, triols, etc., are included.

It should be pointed out that the hydroxy esters, conveniently employed for reaction with polybasic acids to form the break inducers of the present invention, need not necessarily be prepared by reacting the detergent-forming acid with the polyhydric alcohol directly. In many instances it is more convenient to prepare these hydroxy esters by re-esterification of fats, oils, drastically oxidized oils, or detergent-forming acid esters with polyhydric alcohols. For example, a fat such as stearin may be re-esterified with glycerin to form glycerol monostearate, which may be subsequently reacted with a polybasic acid. The preparation of such fractional esters derived from fats, oils, and drastically oxidized oils, is well known and the products are sold commercially under various names. Similar products may be obtained by re-esterification of the oils, fats, drastically oxidized oils, and detergent-forming acid esters with other polyhydric alcohols, such as glycols, sorbitol, mannitol, polyhydroxy amines, or other polyhydric alcohols; and such products may be conveniently employed for the manufacture of the break inducing agents of the present process. Analogous partial esters are obtained from rosin acid, naphthenic acid, and the like.

Often it is convenient to perform the re-esterification simultaneously with the esterification of the polybasic acid. For example, a mixture of a fatty oil, a polyhydric alcohol, and a polybasic acid may be mixed and heated together to yield a break inducing agent. If a hydroxylated oil, such as, for example, triricinolein, is employed, then one need not add a polyhydric alcohol unless desired.

The formation of one kind of break inducer, contemplated for use according to our invention, may be exemplified by the esterification reaction between a polybasic acid and ricinoleic acid. In this case the detergent-forming acid compound contains a single hydroxyl group, and the reaction obviously will yield a simple ester containing a residual carboxylic acid group, but no residual hydroxyl groups.

The formation of a second type of product may be exemplified by the reaction between ethylene glycol monostearate and a polybasic acid. In this case, as well, the result of reaction is a simple ester containing one or more residual carboxyl groups.

If, however, the detergent-forming acid compound is one containing two or more hydroxyl groups (e. g., monostearin, castor oil, or monoricinolein), the esterification reaction with the polybasic acid may become more complex due to the polyfunctionality of both the polybasic acid and the hydroxy compound. If the polyhydroxy compound is represented by $Y'(OH)_n$ and the polybasic acid by $X'(OH)_n$, where $n$ indicates the number 2 or more, then the esterification reaction between these compounds might result in a combination in which there were neither residual carboxyl radicals nor residual hydroxyl radicals, or might result in compounds having residual hydroxyl groups and no residual carboxyl groups, or might result in compounds having residual carboxyl groups and no residual hydroxyl groups; or finally, might result in compounds having both residual carboxyl groups and residual hydroxyl groups. Such compounds may be indicated by the following formulae:

$$(YX)_q(OH)_{n'}$$
$$(YX)_q(COOH)_{n'}$$
$$(OH)_m(YX)(COOH)_{m'}$$

in which $q$ indicates a small whole number (1 in the case of a monomer and probably not over 20 and usually less than 10 in the polymeric form); $n'$ is one or more and $m$ and $m'$ are zero or moderately sized whole numbers, probably less than 40.

These formulae are in reality contractions or simplifications of more elaborate structural formulae, in which $X'$ and $Y'$ are joined by ester linkages. For the sake of simplicity, these more complicated compounds will be referred to as polymers, although it is understood that they are obtained from the monomeric form through the formation of ester linkages and the loss of water. In the hereto appended claims, any reference to the product obtained by an esterification reaction between a polybasic acid and a hydroxy compound will be intended to include the posssible polymerized forms as defined above, as well as the simple esters or monomers.

For practical purposes we have found that the most desirable products are obtained by combinations in which the ratio of the moles of hydroxy compounds to polybasic acid employed in the esterification reaction is within the ratio of 3-1 and 1-5, and in which the molecular weight of the resultant product does not exceed 10,000 and is usually less than 5,000 or perhaps less than 3,000.

In the formulae for the reaction products given above, any residual hydroxyl groups have been indicated in the conventional manner by OH, representing an alcoholic hydroxyl group. In employing these products in the present process, such alcoholic hydroxyls may be left as such or, if desired, may be acylated with monocarboxy acids containing less than 8 carbon atoms. If an ester product contains two or more alcohol hydroxyls per molecule, all or part or none of such hydroxyl groups may be removed by acylation reactions with monocarboxy acids containing less than 8 carbon atoms, and all references herein and in the claims to the final product contemplate not only the ester itself but such simple acylated derivative.

While the finished product may contain acyl groups having less than 8 carbon atoms, it should be remembered that the final ester product must contain at least one oxy-acyl group derived from a monocarboxy detergent-forming acid having more than 7 carbon atoms and not more than 32 carbon atoms.

In the reaction products described, the hydrogen of any residual carboxyl group has been indicated in a conventional manner by H, representing an acidic hydrogen. Obviously such acidic hydrogens can be replaced by an equivalent. Such acidic material may be treated with a suitable alkaline material, such as caustic soda, caustic potash, ammonium hydroxide, calcium hydroxide, magnesium hydroxide, etc., to form the corresponding metallic salts. Amines, such as amylamine, cyclohexylamine, triethanolamine, etc., may be employed for neutralization; or the acidic hydrogen may be replaced by an alcohol residue to form an ester. Amino alcohols, such as ethanolamine, triethanolamine, amino methyl propane diol, amino methyl propanol, and the like, may be employed to replace acidic hydrogens by esterification involving the alcoholic hydroxyl, or by simple neutralization.

It should be pointed out that acids and anhydrides are chemically equivalent, and any reference to either one or the other in the claims is meant to include both the acid and its corresponding anhydride without distinction between isomeric forms. For example, a reference to maleic anhydride would be meant to include maleic acid as well as its isomer, fumaric acid. The term "fatty acids" as used herein and in the claims is intended to have its conventional meaning, i. e., to include those acids whose radicals are found in naturally-occurring fats and oils and are either saturated or unsaturated, and have from 8 to 32 carbon atoms per molecule. This term does not include the lower short chain acids of the acetic acid series.

As to the manufacture of break inducers where polyhydroxy amines are employed, as polyhydric alcohols, reference is made to U. S. Patent 2,154,423, April 18, 1939, to DeGroote et al., wherein are described the methods of manufacture of a few such reagents.

The compounds herein disclosed are preferably used as the sole break inducer for the doctor treatment, in which event the quantity of elementary sulfur employed in the doctor treatment is not in excess of the theoretical amount required to convert the mercaptans. In this preferred operation, where no appreciable excess of sulfur is used in the doctor treatment, there is effected a faster break than can be obtained by means of other break inducers and frequently a break is effected where one might not be otherwise obtainable. Additionally, there is recovered a distillate which is free of excess sulfur, an important advantage as has already been indicated.

However, the invention is not limited to the use of the organic compounds referred to as the sole break inducer but they may be employed in conjunction with other substances having a like property, such as elementary sulfur. In operation of this type, a small excess of sulfur would be used in the doctor treatment, the excess functioning with the compounds of this invention to bring about the desired break in the treatment. The advantages of such operation are that relatively little sulfur is required, the break is induced very rapidly, and frequently a break is effected where one cannot be obtained at all by means of sulfur alone.

As to the preferred operation above indicated, it will be observed that the doctor treatment differs from that heretofore employed in that the quantity of elementary sulfur added is only the theoretical amount based on stoichiometrical calculations, or other comparable test, to convert mercaptans to disulfides and other innocuous compounds, there being present during the treatment no excess of sulfur capable of completely or partially acting as a break inducer.

Elementary sulfur, if present in sufficient excess in the sweetened distillate, can be detected by the doctor test with the addition of a mercaptan such as ethyl or butyl mercaptan. For instance, a sweetened gasoline containing an excess of elementary sulfur no longer shows positive in the doctor test. However, if there is a slight excess of elementary sulfur present, this elementary sulfur can be detected by the addition of butyl mercaptan or the like, followed by a doctor test on the admixture. A large excess may be indicated by the less sensitive copper strip test.

The butyl mercaptan test, referred to above, is commonly used in a qualitative manner to detect excess elementary sulfur. This test is described in the Universal Oil Products Co. Bulletin No. 22, p. 15, as follows:

"In doctor sweetening, the most important factor in securing inhibitor effectiveness, is to use the smallest possible amount of sulfur. Sulfur addition may be controlled by testing with mercury or butyl mercaptan. In making the butyl mercaptan test, a sample of gasoline drawn from the doctor plant after it has left the mixers is allowed to stand until the lead sulfide has settled, and 30 cc. filtered into a 4 ounce oil sample bottle. 20 cc. of a 1 to 1400 solution of butyl mercaptan is added and 10 cc. of doctor solution. The mixture is shaken for 15 seconds and observed. The sample should be green-yellow. It will slowly become opaque but should remain yellow in color even if observed for 30 minutes. If it turns orange or brown, excess sulfur has been used, and on addition of inhibitor the gasoline will have lower induction period and higher copper dish gum than would have resulted had less sulfur been used."

The chemistry of the reactions which enter into doctor sweetening is rather complex and not completely understood. However, it is common practice, for the purpose of calculating the amount of sulfur necessary, to use the following reaction as being representative:

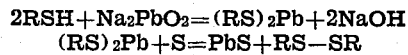

wherein R represents the hydrocarbon group of a mercaptan or disulfide.

The amount of sulfur required for completion of these reactions may be calculated from the original mercaptan content of the distillate. With some distillates, the sweetening reaction appears to lead to the formation of stable trisulfides, rather than disulfides. In this case the reactions presumably proceed as follows:

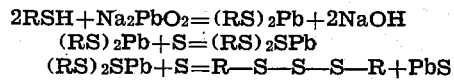

With distillates where these reactions take place, the theoretical sulfur requirement may be calculated by use of the above equations and the known original mercaptan content of the distillate. However, for all practical purposes, the butyl mercaptan test, previously described, may be used as a test for whether or not excess sulfur has been used. Accordingly, the term "negative to the butyl mercaptan test," as applied to sweetened distillates, is used herein to mean that a distillate has been sweetened with the theoretical amount of sulfur, or that the minimum amount of sulfur necessary for completion of the sweetening reaction has been employed. The reason for this is that the butyl mercaptan test may be made more easily and more quickly than a determination of the actual course or nature of the sweetening reactions.

As is understood, of course, if hydrogen sulfide is present, allowance must be made for the amount of lead required to remove such sulfide. However, this is not apt to be a factor requiring consideration, due to usual preliminary removal of hydrogen sulfide.

In view of what has been said previously, it is obvious that the satisfactory application of the doctor treatment must involve a rapid and complete separation of lead sulfide and associated insoluble material, as soon as the mercaptans are converted into disulfides or other more innocuous compounds. Although the above reactions indicate only precipitation of lead sulfide, it has been found that in reality a precipitate may contain a comparatively small amount of lead sulfide; and there may also be present various complex materials, part of which at least are organic in nature and may represent basic mercaptides. The equations indicate that the amount of elementary sulfur to be added per pound of combined sulfur present as mercaptan should be in the ratio of one-half to one. In actual practice, however, with the conventional doctor treatment, the quantity of sulfur added for complete reaction, and particularly to give subsidence or settling of the black precipitate, is not so definite. As a matter of common practice, sulfur is added in the conventional doctor treatment for two distinct purposes of converting mercaptans and inducing the break; and these two purposes must be fully appreciated in order to understand the benefit obtained by applying the improved procedure which constitutes our present invention, particularly in its preferable form, i. e., where the complex organic compounds herein described are used as the sole break inducer, with only the theoretical amount of sulfur to convert mercaptans or to give a negative butyl mercaptan test.

It has heretofore been proposed to employ water soluble soaps to effect the break in doctor treatment, the soaps being utilized in ratios of 1 to 2500 or 1 to 7500. At such ratios, the common soaps are often ineffective and hence there is the tendency to employ just as much sulfur as if no soap had been added. In contradistinction to the common soaps heretofore contemplated, the break inducers of the present invention are invariably effective and invariably enable a marked reduction in the amount of sulfur needed in the doctor treatment, even to the extent, as in the preferred embodiment already described, of limiting the sulfur to the theoretical amount necessary for converting the mercaptans into innocuous compounds.

The break inducers of this invention need be used in only very minute quantities, for example, in ratios varying from 1 to 5000 or 1 to 7500 or even 1 to 75,000, based on recovered or sweetened gasoline or other distillate treated. To the extent that our improved break inducers possess the property of forming oil-in-water emulsions, it should be observed that they are employed in such insignificant quantities that they do not exhibit any detectable or appreciable emulsifying action.

Although our invention can be applied to any variation of the conventional doctor treatment in a manner which is most convenient under the specific conditions surrounding the particular operation, for purposes of brevity, we will describe only the preferable form of procedure, i. e., where the herein disclosed organic compounds are used as sole break inducers. It is obvious, however, that those skilled in the art and acquainted with such procedure could readily modify the conventional doctor treatment in which elementary sulfur is used as a break inducer, so as to reduce the amount of sulfur employed, and offset that reduction by suitable quantities of the break inducers of this invention.

In a continuous doctor sweetening plant, the organic break inducer is added continuously to the stream of sour distillate prior to its admixture with doctor solution and sulfur. When the break inducer is a liquid, this is conveniently done by means of a small injector pump adjusted to deliver the break inducer in some definite, desired amount, usually within the limits of one part per 7500 to 75,000 parts of gasoline. After the introduction of break inducer has begun, the amount of sulfur added to the distillate, or to the mixture of distillate and doctor solution, is decreased to the theoretical amount.

In batch system doctor sweetening plants, the required amount of break inducer is introduced into the sour distillate and mixed thoroughly before the treatment with doctor solution and sulfur. In this case, also, the amount of sulfur used is reduced to the theoretical amount.

Sometimes better results are obtained if the break inducer is added to the doctor solution or to the distillate after the latter has been mixed with doctor solution and sulfur. Regardless of the point of introduction of the break inducer, however, the amount of sulfur required for completion of the sweetening reactions and subsidence of the black precipitate is reduced to, or nearly to, the theoretical amount.

The doctor solution used for sweetening is generally regenerated after each use and employed for sweetening further amounts of sour distillate. Where the break inducer has been added to the doctor solution, its activity may persist thru one or more regenerations, but eventually further amounts will have to be added. The number of volumes of distillate sweetened per volume of break inducer used in the doctor solution usually will be more than 7500, and the ratio of break inducer may average one part to 25,000 parts sweetened distillate.

In order to illustrate the effectiveness of the complex organic materials employed as break inducers, the following table is included. This table includes the results obtained on the gasoline produced from a mixture of Louisiana and Arkansas crudes and is typical of a number of similar tests obtained on the wide varieties of gasoline derived from other sources and produced in various refineries, and is also typical of actual plant operations. Figures refer to tests made with 100 gm. portions of gasoline.

In the table, B—1 refers to a break inducing agent prepared by condensing oxalic acid with the product obtained by re-esterification of one mole of castor oil with three moles of triethanolamine;

B—2 refers to a break inducer obtained by an esterification reaction between phthalic anhydride and diglycerol monoricinoleate, followed by neutralization of residual carboxyl groups with triethanolamine;

B—3 refers to a break inducer obtained by an esterification reaction between maleic anhydride and glyceryl monoricinoleate;

B—4 refers to a break inducer obtained by an esterification reaction between phthalic anhydride and commercial castor oil; and B—5 refers to a break inducer obtained by an esterification reaction between phthalic acid and the product obtained by re-esterification of pale blown castor oil with triethanolamine.

Descriptions of the preparation of materials such as the above-mentioned break inducers may be found in various places in the literature. For descriptions of the methods of manufacture of some of the more important types, reference is made to U. S. Patents 1,976,602, October 9, 1934; 2,154,423, April 18, 1939; 2,176,703, October 17, 1939; 2,176,704, October 17, 1939; to DeGroote et al. Reference is also made to U. S. Patent 1,977,146, October 16, 1934, to Roberts.

in each case, an excellent break was obtained even when there was no sulfur available for break

| Mg. of sulfur required (theory) | Actual mg. of sulfur used | Break inducer used | Ratio of break inducer used to distillate treated | Character of break | Doctor test on distillate | Butyl mercaptan test on distillate |
|---|---|---|---|---|---|---|
| 6.0 | 6.0 | None | 0 | None obtained | | |
| 6.0 | 7.0 | do | 0 | do | | |
| 6.0 | 8.0 | do | 0 | Good | Negative | Positive. |
| 6.0 | 6.0 | Sodium stearate | 0.0002 | None obtained | | |
| 6.0 | 7.0 | do | 0.0002 | Fair | Negative | Positive. |
| 6.0 | 6.0 | Sodium oleate | 0.0002 | None obtained | | |
| 6.0 | 7.0 | do | 0.0002 | Fair | Negative | Positive. |
| 6.0 | 6.0 | Castile soap | 0.0002 | None obtained | | |
| 6.0 | 7.0 | do | 0.0002 | Good | Negative | Positive. |
| 6.0 | 6.0 | Sodium resinate | 0.0002 | None obtained | | |
| 6.0 | 7.0 | do | 0.0002 | Fair | Negative | Positive. |
| 6.0 | 6.0 | B-1 | 0.00005 | Good | do | Negative. |
| 6.0 | 6.0 | B-2 | 0.00005 | do | do | Do. |
| 6.0 | 6.0 | B-3 | 0.00005 | do | do | Do. |
| 6.0 | 6.0 | B-4 | 0.00005 | do | do | Do. |
| 6.0 | 6.0 | B-5 | 0.00005 | do | do | Do. |

Examination of the above table emphasizes the numerous salient points previously discussed. For instance, reference is made to those tests in the above table which are concerned with the use of the common, rather simple, type of break inducer, to wit, materials such as sodium stearate, sodium oleate, castile soap, sodium resinate and the like.

Furthermore attention is directed to the first three tests which indicate the results obtained when sulfur alone is used as the break inducer. It is to be noted that in the tests as conducted, it was necessary to use six milligrams of sulfur in order to complete the chemical reactions. On the other hand, the addition of 17% excess of sulfur, i. e., the use of 7 milligrams of elementary sulfur, did not give a break. However, when the amount of sulfur used was increased to 8 milligrams, i. e., a 33⅓% excess, then a perfectly satisfactory break was obtained. Obviously such excess of elementary sulfur resulted in a positive butyl mercaptan test. When an effort was made to substitute the common soap type of break inducer for elementary sulfur, it was found that its use, in amount equivalent to 10 times the amount of sulfur required for break induction, did not give satisfactory results. For instance, when the 2 milligram excess of elementary sulfur was replaced by 20 milligrams of sodium stearate, the break obtained was only fair. This same condition prevailed when a similar amount of sodium oleate or sodium resinate was employed. Only in the case of castile soap were results obtained which could be characterized as good; i. e., sufficiently satisfactory to indicate they would be satisfactory under practically all plant conditions. However, when the amount of sulfur used was only theoretical, that is only six milligrams, and when an effort was made to rely upon the simple break inducers solely for break induction, then it is to be noted that absolutely no break was obtained. In other words, if one adds only the amount of elementary sulfur required to complete the chemical reaction and attempts to depend on the addition of sodium stearate, sodium oleate, castile soap or sodium resinate, as sole break inducers, satisfactory results were not only unobtainable but a satisfactory break was not obtained even when these compounds were employed in a ratio of 1 to 5000. In comparison to the results above indicated, attention is directed to the results obtained when employing the complex break inducers herein contemplated for use in the doctor treatment.

It is to be noted that the break inducers of this invention were used in a ratio of 1 to 20,000 and in each case, an excellent break was obtained even when there was no sulfur available for break induction, or to say it in another way, when the amount of sulfur employed was only sufficient to complete the chemical reactions involved. In each instance, since there was no excess sulfur employed, the butyl mercaptan test obviously has to be negative. Since the butyl mercaptan test had to be negative, it followed that the gasoline was of a type which was free from certain inherently objectionable qualities which are common when there is an excess of elementary sulfur present, or when the gasoline gives a positive butyl mercaptan test. In each instance, the break obtained was the kind characterized as being "good", i. e., appeared to be satisfactory under any condition of plant operation which one would ordinarily employ.

We have previously indicated that the amount of added break inducer may be as low as one part in 75,000 parts of the oil being sweetened. In practice, however, the amount of break inducer actually present in the oil may be even less than this during certain phases of the process. For example, in an operation involving recirculation of doctor solution, the ratio of break inducer in the first batch of oil may not exceed one to 30,000 or even one to 45,000 but recycling of the doctor solution once or twice, without further addition of break inducer, may result in an actual ratio of 1–80,000 or 1–90,000 or even a ratio in excess of 1–100,000 in subsequent batches of oil. Therefore, it is to be understood that the heretofore mentioned ratios of 1–75,000 is not the upper limit of effectiveness, particularly in a recirculation process.

It will be further understood that, instead of employing a single break inducer of the kind herein disclosed, a mixture of two or more of them may be used, if desired. Indeed, the process of manufacture may result in the production of a mixture of a number of break-inducing compounds rather than a single compound in a technically or chemically pure state. Moreover, a break inducer of this invention may be employed in admixture with other types of break inducers for which we have filed separate applications.

Frequently, the compounds of this invention have beneficial effects in addition to bringing about rapid subsidence. For example, as a result of their use, the amount of "black strap" or feathery material appearing at interfacial surfaces may be greatly diminished or entirely eliminated.

It is to be understood that the detailed disclosures herein are for illustrative purposes only and are not to be considered as limitations on the invention, inasmuch as various modifications within the scope of the appended claims will be apparent to those skilled in the art.

Having described our invention, we claim:

1. In the sweetening of sour hydrocarbon oils by treatment with doctor solution and elementary sulfur, the method of facilitating settling or subsidence in the doctor treatment which comprises adding an organic break inducing agent comprising a product derived by an esterification reaction between a polybasic carboxy acid and a hydroxy compound containing an oxy-acyl radical derived from a detergent-forming monocarboxy acid having from 8 to 32 carbon atoms.

2. A method for sweetening hydrocarbon oils containing mercaptans which comprises treating the oil with doctor solution and sufficient elementary sulfur to convert the mercaptans into innocuous compounds, and inducing a break in said treatment by incorporating into the oil a product derived by an esterification reaction between a polybasic carboxy acid and a hydroxy compound containing an oxy-acyl radical derived from a detergent-forming monocarboxy acid having from 8 to 32 carbon atoms.

3. A method for sweetening hydrocarbon oils containing mercaptans which comprises treating the oil with doctor solution and a quantity of elementary sulfur not appreciably in excess of the theoretical amount required to convert the mercaptans into innocuous compounds, and inducing a break in said treatment by incorporating into the oil a product derived by an esterification reaction between a polybasic carboxy acid and a hydroxy compound containing an oxy-acyl radical derived from a detergent-forming monocarboxy acid having from 8 to 32 carbon atoms.

4. A method for sweetening hydrocarbon oils containing mercaptans which comprises converting the mercaptans into innocuous compounds by treatment of the oil with alkaline plumbite solution and elementary sulfur, the amount of sulfur being insufficient to render the oil positive to the butyl mercaptan test and insufficient to effect settling or subsidence, and inducing a break in said treatment by adding a product derived by an esterification reaction between a polybasic carboxy acid and a hydroxy compound containing an oxy-acyl radical derived from a detergent-forming monocarboxy acid having from 8 to 32 carbon atoms.

5. In the sweetening of sour hydrocarbon oils by treatment with doctor solution and elementary sulfur, the improvement which comprises facilitating the break in said treatment by the addition of a product derived by an esterification reaction between a polybasic carboxy acid and a hydroxy compound containing an oxy-acyl radical derived from a fatty acid.

6. In the sweetening of sour hydrocarbon oils by treatment with doctor solution and elementary sulfur, the improvement which comprises facilitating the break in said treatment by the addition of a product derived by an esterification reaction between a polybasic carboxy acid and a polyhydroxylated compound containing an oxy-acyl radical derived from a fatty acid.

7. In the sweetening of sour hydrocarbon oils by treatment with doctor solution and elementary sulfur, the improvement which comprises facilitating the break in said treatment by the addition of a product derived by an esterification reaction between a dibasic carboxy acid and a polyhydroxylated compound containing an oxy-acyl radical derived from a fatty acid.

8. In the sweetening of sour hydrocarbon oils by treatment with doctor solution and elementary sulfur, the improvement which comprises facilitating the break in said treatment by the addition of a product derived by an esterification reaction between phthalic acid and a polyhydroxylated compound containing an oxy-acyl radical derived from a fatty acid.

9. In the sweetening of sour hydrocarbon oils by treatment with doctor solution and elementary sulfur, the improvement which comprises facilitating the break in said treatment by the addition of a product derived by an esterification reaction between phthalic acid and a polyhydroxylated compound having no hydroxyl groups attached to a polyhydric alcohol residue and containing an oxy-acyl radical derived from a fatty acid.

10. In the sweetening of sour hydrocarbon oils by treatment with doctor solution and elementary sulfur, the improvement which comprises facilitating the break in said treatment by the addition of a product derived by an esterification reaction between phthalic acid and a superglycerinated fat having at least two free hydroxyl groups, at least one of which is attached to a glyceryl radical.

11. In the sweetening of sour hydrocarbon oils by treatment with doctor solution and elementary sulfur, the improvement which comprises facilitating the break in said treatment by the addition of a product derived by an esterification reaction between phthalic acid and a polyhydroxylated compound obtained from a polyhydroxy amine and containing an oxy-acyl radical derived from a fatty acid.

12. In the sweetening of sour hydrocarbon oils by treatment with doctor solution and elementary sulfur, the improvement which comprises facilitating the break in said treatment by the addition of a product derived by an esterification reaction between phthalic acid and castor oil.

13. A method for sweetening hydrocarbon oils containing mercaptans which comprises converting the mercaptans into innocuous compounds by treatment of the oil with alkaline plumbite solution and elementary sulfur, and inducing a break in said treatment by the addition of the esterification product of phthalic acid with castor oil.

CHARLES M. BLAIR, Jr.
IRA S. BOYDSTUN.